No. 695,779. Patented Mar. 18, 1902.
N. L. ANDERSON.
TYPE WRITER.
(Application filed July 17, 1901.)
(No Model.) 5 Sheets—Sheet 1.

Witnesses
F. H. Schott
Chas. J. O'Neill

Inventor
Neal L. Anderson,
by
Jennie V. Goldsbury
Attorneys

No. 695,779. Patented Mar. 18, 1902.
N. L. ANDERSON.
TYPE WRITER.
(Application filed July 17, 1901.)
(No Model.) 5 Sheets—Sheet 2.

WITNESSES:
F. H. Schott
Chas. J. O'Neill

INVENTOR
Neal L. Anderson,
BY Curtis & Goldsborough
Attorneys

THE NORRIS PETERS CO., PHOTO-LITHO., WASHINGTON, D. C.

No. 695,779. Patented Mar. 18, 1902.
N. L. ANDERSON.
TYPE WRITER.
(Application filed July 17, 1901.)
(No Model.) 5 Sheets—Sheet 3.

Witnesses
F. H. Schott
Chas. J. Neill

Inventor
Neal L. Anderson,
by
Attorneys

No. 695,779. Patented Mar. 18, 1902.
N. L. ANDERSON.
TYPE WRITER.
(Application filed July 17, 1901.)
(No Model.) 5 Sheets—Sheet 4.

No. 695,779. Patented Mar. 18, 1902.
N. L. ANDERSON.
TYPE WRITER.
(Application filed July 17, 1901.)
(No Model.) 5 Sheets—Sheet 5.

WITNESSES:
F. H. Schott
Chas. J. Neill

INVENTOR
Neal L. Anderson,
BY Lennie & Goldsborough
Attorneys

THE NORRIS PETERS CO., PHOTO-LITHO., WASHINGTON, D. C.

UNITED STATES PATENT OFFICE.

NEAL LARKIN ANDERSON, OF MONTGOMERY, ALABAMA.

TYPE-WRITER.

SPECIFICATION forming part of Letters Patent No. 695,779, dated March 18, 1902.

Application filed July 17, 1901. Serial No. 68,609. (No model.)

*To all whom it may concern:*

Be it known that I, NEAL LARKIN ANDERSON, a citizen of the United States, residing at Montgomery, county of Montgomery, State of Alabama, have invented certain new and useful Improvements in Type-Writers; and I do hereby declare the following to be a full, clear, and exact description of the invention, such as will enable others skilled in the art to which it appertains to make and use the same.

My invention relates to type-writers, and has for its object to provide a motor for returning the paper-carriage to its starting-point and a primary motor operatively connected to the first-mentioned motor to maintain the energy of the first motor.

In carrying out my invention I preferably employ a spring-motor, which is adapted to be clutched to a driving-pulley in turn connected to the carriage by suitable means to reverse the travel of the carriage at any point. The tension of the spring of this motor is maintained by means of a small motor, preferably an electric motor, which is thrown into operation simultaneously with the return-motor and is automatically cut out of circuit when said spring has been restored to its normal tension. The means for starting the two motors comprises a let-off lever for the return-motor and a circuit-closer actuated thereby or coincidently therewith to complete the circuit to the electric motor, and said lever is actuated either directly or through intermediate mechanism from a key located on or in proximity to the keyboard of the type-writer.

My entire motor mechanism constitutes a simple compact unitary structure that is adapted to be applied to any type-writer having a transversely-moving paper-carriage.

The invention is illustrated in the accompanying drawings, in which—

Figure 1 is a side elevation of my motor mechanism shown as a separate structure to be applied to a type-writer. Fig. 2 is a rear elevation.

Figure 11:
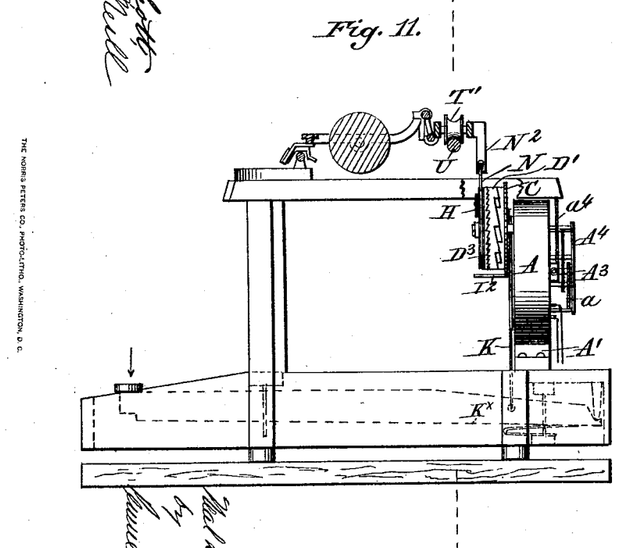
Figs. 11 and 12 are a side elevation and a transverse section, respectively, of a Remington type-writer, with the carriage-return motor mechanism attached.
Figure 12:
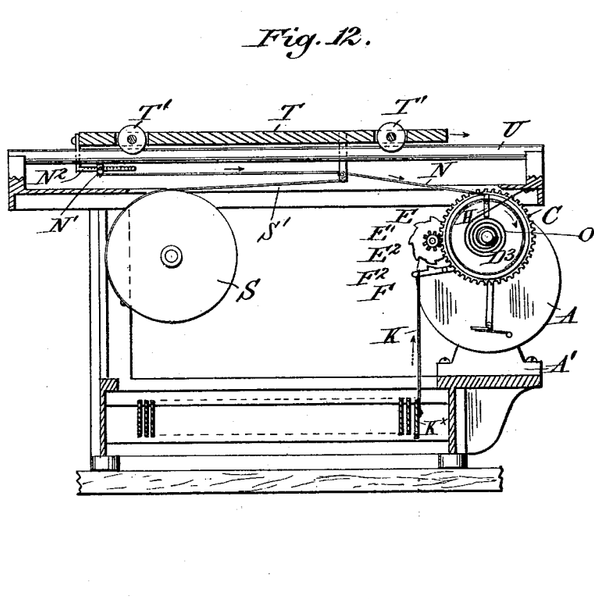

Referring to the drawings, A represents the frame of a small electric motor, mounted on a standard A', by which it may be secured through the agency of bolts to the rear right-hand corner of a type-writer, as illustrated in Figs. 11 and 12. To the armature-shaft $A^2$ is secured a pinion $A^3$, which is operatively connected to a shaft B through a train of reducing-gears $a$, $a'$, $a^2$, $a^3$, and $a^4$. The various gears are mounted on stub-shafts journaled in a face-plate $A^4$ and the opposing face of the casing A of the motor. Shaft B finds a bearing in the opposite faces of the motor-casing, but it is obvious that said shaft may be supported in separate bearings external to the motor.

Loosely mounted on the shaft B is a pinion C, to which is attached a drum C', interiorly of which is a volute spring $C^2$, secured at one end to the inner periphery of the drum C' and at the other to the shaft B. Surrounding the drum C' and secured to the gear C is a cam-rim D, having on its edge a series of teeth having inclined faces $d$, which are adapted to engage faces $d'$ of oppositely-disposed teeth on a clutch or coupling ring D', loosely mounted on drum C'. The opposite edge of ring D' is provided with a relatively large number of teeth $d^2$, inclined in the opposite direction to teeth $d'$. A pulley $D^3$, mounted loosely on shaft B and secured against end movement by a bolt B', let into the shaft end, is provided with a rim D², having clutch-teeth d³, mating with teeth d² on a ring D'.

A stub-shaft E, mounted in the motor-casing, carries a pinion E' engaging gear C, and a ratchet-wheel E², provided with a series of radial teeth about its periphery. Normally engaging the ratchet-wheel E² and restraining the spring-drum C is a pawl F², formed on lever F, which in turn is mounted on the motor-casing A by means of a pivot F'. This lever F, which constitutes the starting and stopping device for the spring-drum and the electric motor, is connected at one end to the link K, and at its opposite end is provided with a toe F³, having a flat under side, between which and the pivot F' is a recess or cut-away portion F⁴.

Figure 3:
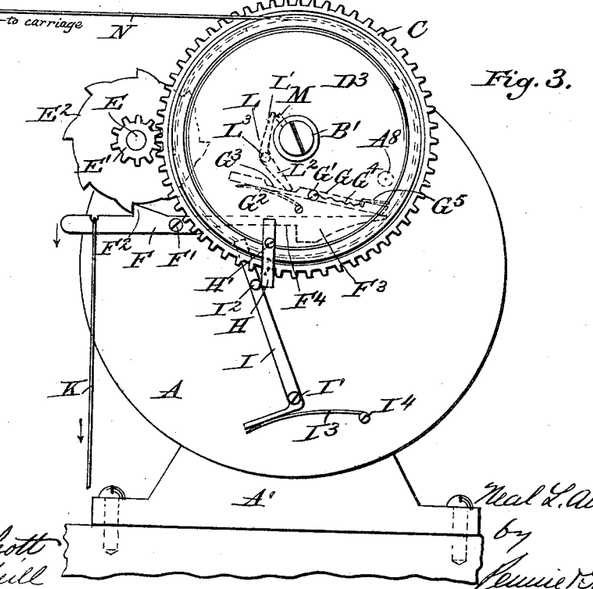
Fig. 3 is a front elevation, of the same.

Pivoted to the motor-casing at G', above lever F, is a second lever or bar G, which is held normally in inoperative position by a flat spring G², likewise secured to the casing. The outer end of lever G is provided with a pivoted contact-finger G⁵, which when said lever is lifted by lever F, as will be hereinafter explained, engages a contact A⁸ on the motor-casing to close the motor-circuit. A locking-latch L, comprising arms L' and L², pivoted at L³, normally engages a recess G³ in lever G with the end of arm L², while arm L' lies in proximity to shaft B. An L-shaped locking-arm I for lever F is pivotally mounted on the motor-casing at I' and is acted upon by a flat spring I³, secured to the casing at I⁴, which tends to force said arm I to assume a vertical position with its upper end resting under the toe F³ of lever F. Secured to the pulley D by a suitable pin H' is a trip H, which is adapted to engage a laterally-projecting pin I² on arm I. Upon the shaft B is adjustably mounted a collar M', which is secured to said shaft by a screw-threaded pin M, the projecting end of said pin being adapted to engage the upper end L' of the latch, as indicated in Fig. 3, and force the lower end L² of said latch out of engagement with lever G.

The circuit for supplying current to the electric motor leads from one side of a suitable battery or main to a binding-post A⁶, thence to pivot G' and to wire G⁴ on lever G, to contact-finger G⁵, to contact A⁸, thence through the field and armature coils of the motor by way of brushes A¹¹ and A¹² to binding-post A⁷ back to the source.

The motor mechanism as thus described is adapted to be attached to a type-writer in the manner clearly illustrated in Figs. 11 and 12. In the figures referred to the type-writer referred to is of the well-known Remington class, having a paper-carriage T mounted on the rollers T', engaging rail U. The usual spring-drum S is connected to the carriage by band S' to propel the carriage forward after each operation of the printing-keys in the manner common to such machines.

The carriage-return mechanism is secured to the base of the type-writer frame adjacent to the rear right-hand support or corner-post. A band or ribbon N, secured at one end to the periphery of pulley D³, is adjustably attached to the carriage T by means of an L-shaped bracket N² and a collar N', slidably secured thereon. Link K is attached to the key-lever K×, which is provided as a shifting key. A light spring, as O, may be attached to the hub of pulley D³ at one end and to some fixed part, as the type-writer frame or the motor-casing, and serves to revolve the pulley and keep the band N taut when the carriage is moved back by hand. The spring C² is wound to the desired tension and the apparatus is ready for operation.

Figures 1, 2:
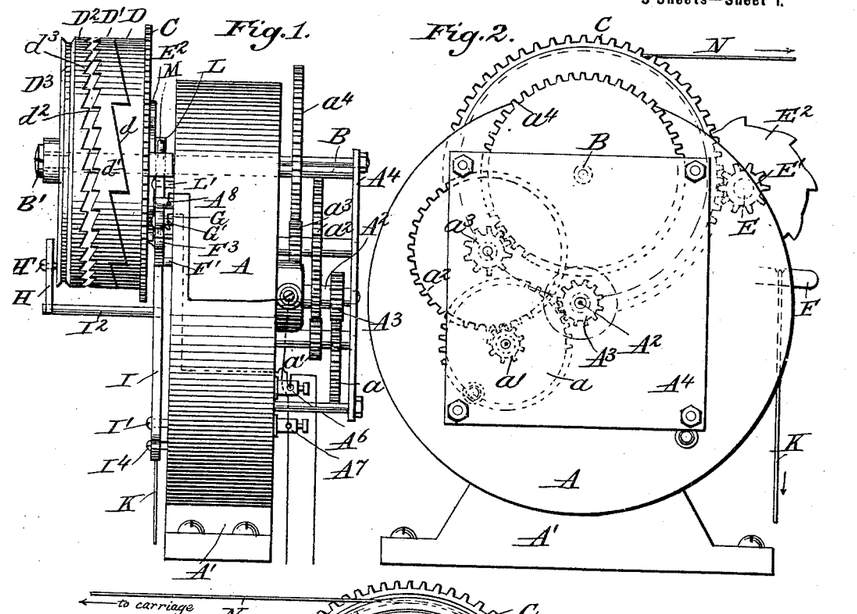
Figures 4, 5:
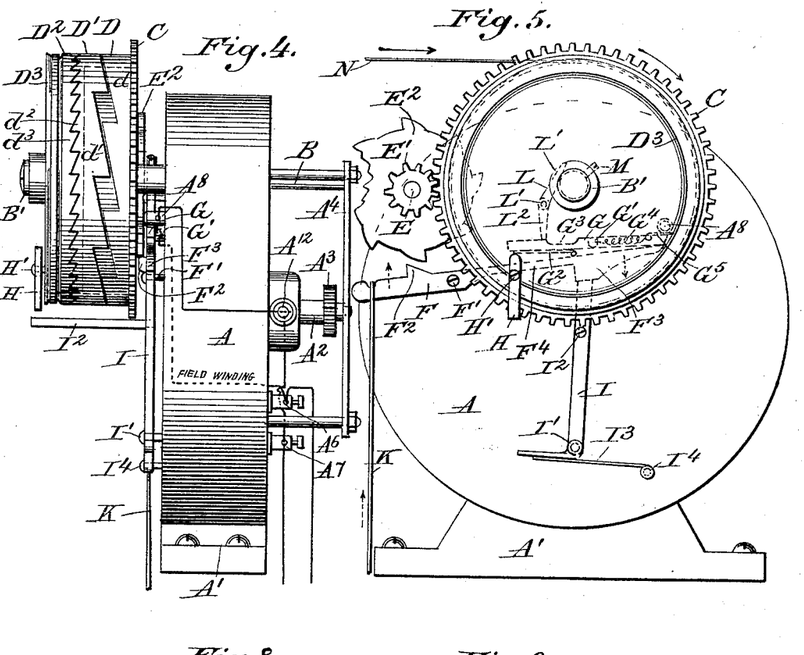
Fig. 4 is a view corresponding to Fig. 1, showing the relative position of parts while both motors are operating.
Fig. 5 is a front elevation of the device as shown in Fig. 4.
Figures 6, 7:
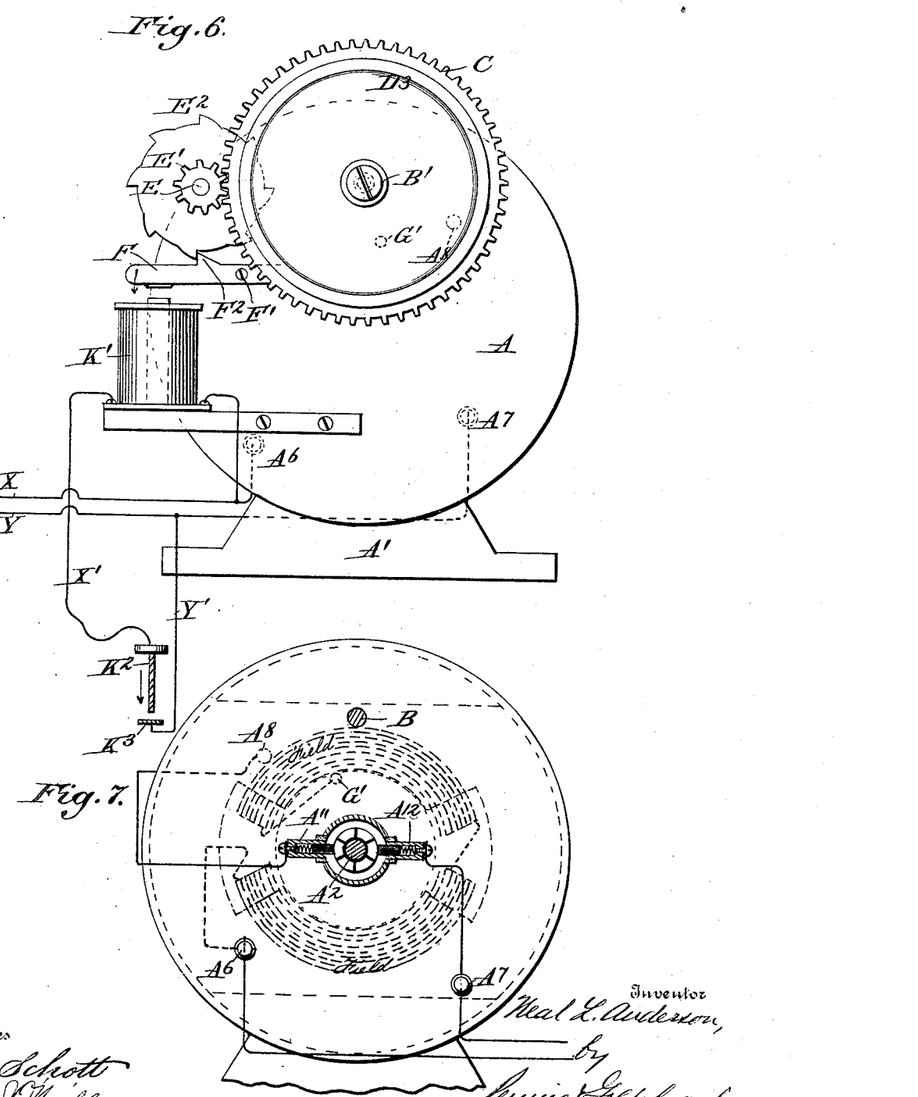
Fig. 6 is a similar view to that in Fig. 3, with certain details omitted, showing a modified form of starting mechanism.
Fig. 7 is an elevation showing the electric motor-winding schematically.
Figure 8:
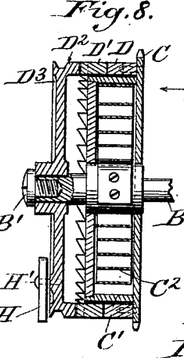
Figs. 8 and 9 show a vertical section and an end elevation, respectively, of the spring-drum and the driving-pulley with the connecting-clutch.
Figure 9:
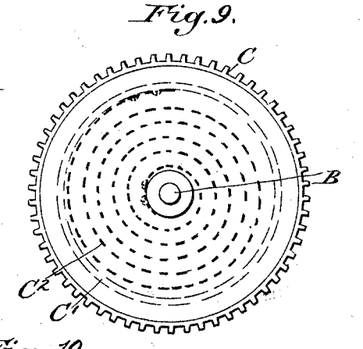
Figure 10:
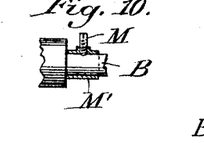
Fig. 10 is a detail of the trip mechanism for the circuit-closer lock.

The operation is as follows: As the operator depresses the respective keys in printing the carriage is impelled in its forward movement by the usual spring-motor S, as will be understood. Under these circumstances the return mechanism is in the condition represented in Fig. 1 of the drawings. The circuit of motor A is opened at G⁵ A⁸, and pawl F², on lever F, engages a tooth of ratchet E, and thereby locks the drum D against rotation under the influence of spring C². Ring D' has its cam-teeth d' engaging the corresponding cam-teeth d of the rim D, and the mating clutch-teeth d² of the ring D' and d³ of pulley D³ are out of engagement. Under these conditions as the carriage advances the band N is unwound from the pulley D³, and the latter is rotated in the direction of the arrow in Fig. 3. Upon reaching the end of a line or when desiring to return the carriage to its initial position from any intermediate point in its movement the operator strikes key K×, which, acting through link K, pulls down lever F, releases pawl F² from engagement with ratchet E², and allows the spring C² to rotate gear C and cam-rim D. The rotation of said rim D causes the cam-teeth d to ride up the inclines of teeth d' on ring D' and forces said ring toward pulley D³, when the clutch-teeth d² d³ come into engagement, and pulley D³ is carried around with the spring-drum, winding up the band N and reversing the carriage T, and thereby restoring the tension of the spring in motor S. As lever F is pulled down by link K, the end opposite the pivot F' rises and toe F³ engages lever G, rocks it upon its pivot until contact-finger G⁵ engages contact-post A⁸. Simultaneously locking-arm I is forced by its spring I³ under the toe F³ of lever F, and latch L tilts forward until its end L² engages the end of lever G and both F and G are locked in the positions shown in Fig. 5. The electric motor rotates and through the train of reducing-gears a' to a⁴ drives shaft B in the direction to wind spring C², thus restoring the normal tension to this spring. As the carriage approaches the end of its return movement the trip H on pulley D³ strikes the projecting pin I² of locking-arm I and forces said arm out of engagement with lever F, which immediately rocks on its pivot and interposes pawl F² in the path of the next approaching tooth on ratchet E², which stops the rotation of the spring-motor. The carriage having acquired considerable momentum moves onward to the end of its travel, and as pulley D³ and ring D' are loose on the shaft B the continued movement of D' brings the straight sides of teeth d' into contact with the corresponding portions of teeth d on rim D, which is then stationary, and immediately arrests the rotation of the ring D'. The forward movement of pulley D³ causes the inclined faces of clutch member D² to ride up the corresponding faces of the teeth d² on the ring D', with the result that said ring is forced out of engagement with pulley D³, and the parts again occupy the relative positions indicated in Fig. 1. When the shaft B has been revolved by the electric motor through the train of gears one completed revolution, the pin M on this shaft strikes the upper end of latch L, and since the lever F has already fallen this pin M forces the lower end L² into the notch G³ of lever G, whereupon spring G² rocks said lever G on its pivot and separates the contacts G⁵ and A⁸, thereby breaking the motor-circuit, when the motor quickly comes to rest.

By shifting the pin M on the shaft B the tripping of latch L may be varied, so that the motor-circuit may be broken at the instant of stopping the spring-motor or at some period subsequent thereto. By releasing the pin M by means of the set-screw from the shaft B and starting the electric motor the energy of the spring in the return-motor may be increased at will. When the pin M has again been adjusted and made fast to the shaft, this energy will be automatically maintained practically normal. By moving the sleeve N' along the bracket N² the carriage may be returned to a point to accommodate any desired marginal adjustment.

When it is found desirable, I may dispense with the link-and-key connection for actuating lever F and apply in lieu thereof an electromagnet K', which operates to depress lever F by attracting an iron armature attached to said lever. Said electromagnet may be energized by current from the main source of supply for the motor, and the circuit for said magnet is completed and controlled by a key K², which is adapted to be moved into engagement with an anvil or contact K³. The key may be mounted on the regular keyboard or it may be attached to any other part of the machine-frame that may be found convenient or desirable.

Figure 13:
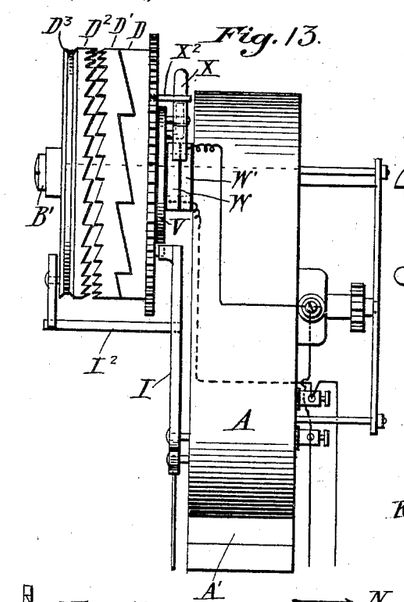
Fig. 13 is a side elevation of a modification illustrating a simplified form of circuit-closer for starting and stopping the electric motor.
Figure 14:
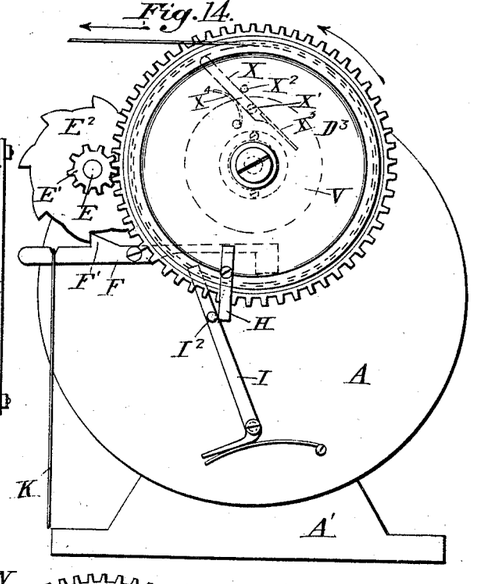
Figs. 14 and 15 are end elevations of this modified device, showing the circuit-closer in "off" and "on" positions, respectively.
Figures 15, 16, 17:
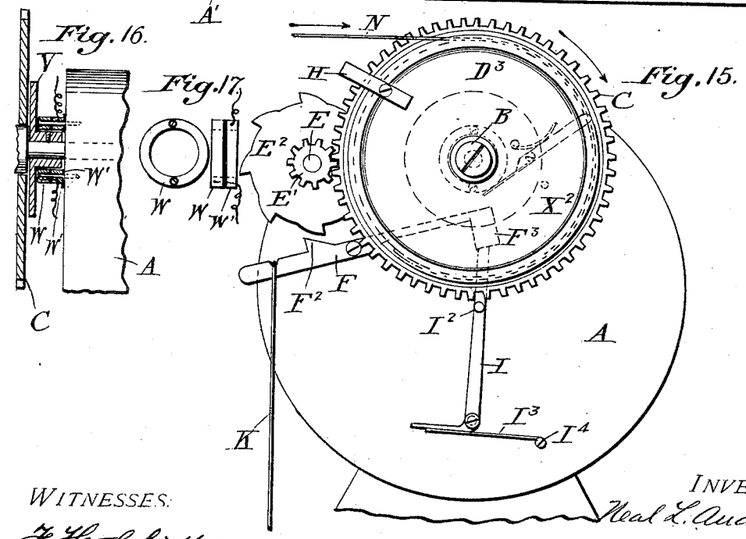
Fig. 16 is a fragmentary portion of Fig. 13, partly in section.
Fig. 17 shows detail views in front and side elevation, respectively, of the two rings through which the motor-circuit is closed.

In the modification of my invention illustrated in Figs. 13 to 17, inclusive, I employ the same type of motor mechanism as that shown in the figures heretofore described. The let-off and the stop device for the return-spring motor is practically identical with that shown in the other figures; but the circuit-closing mechanism for the electric motor is much more simple than that shown in the preceding figures, and in many respects is to be preferred to the other form in that it is adapted to cause the electric motor to operate the spring-drum in rewinding the spring to exactly the same extent that said drum was operated in the reverse direction to return the carriage, and hence the spring is restored to precisely its normal tension. As the motor mechanisms are the same as those heretofore described it will not be necessary to refer to them further in detail. The circuit-closing mechanism for the electric motor may be described as follows: A disk V, preferably of fiber, is secured to the shaft B by a set-screw through its hub, as indicated in Fig. 16. Surrounding the hub of this disk and secured to the motor-casing are two conductor-rings W W', the former of which forms the terminal of a circuit-wire leading from a binding-post on the motor-frame and the latter is connected with the circuit-wire leading to one of the brushes, and thence through the motor, as will be understood. These two rings W W' are insulated from each other and from the frame and the first-mentioned circuit-wire is led through the ring W', from which it is insulated and connected to the ring W, as illustrated in Fig. 13. Pivoted to the disk V by means of a suitable pin X' is a lever X, preferably of insulating material, which has on its end adjacent to the rings W W' a copper brush X³, which spans the space between the brushes and closes the circuit between said rings under proper conditions. A spring X⁴, likewise secured to the disk V, acts upon the lever X to force the brush X³ into contact with the rings W W'. Projecting laterally from the face of the gear-wheels C, secured to the spring-drum, is a pin X², which normally engages the upper end of lever X to tilt the same against the tension of the spring X⁴ and lift the brush from the rings W W'. The operation of this device is as follows: Upon reaching the end of a line or when desiring to return the carriage from any intermediate point in the line the operator depresses the shift-key, as before. This effects the release of the spring-motor by moving the pawl or detent F² on lever F from behind the engaging tooth on the ratchet E² at the same time the locking-lever I is forced by its actuating-spring I³ under the forward end of lever F to hold it in its released position, as heretofore described. The spring-motor immediately starts to revolve, and thereby causes the clutch members to engage, with the result that the paper-carriage is quickly started on its return movement. The forward movement of the spring-drum, as illustrated by the arrow in Fig. 15, moves pin X² from engagement with the lever X, thereby permitting the spring X⁴ to rock the lever X until the brush X³ engages both of the contact-rings W W' to close the circuit through the electric motor, which immediately starts to rewind the spring of the return-motor. When the carriage reaches its initial position to start a new line, the trip H engages the pin I² on lever I and rocks said lever forward to release lever F, which again engages the ratchet E², as heretofore described. The spring-motor is thereby brought to a stop and the shaft B continues to revolve, lever X again comes in contact with the pin X², carried by the spring-motor, and said lever is rocked upon its pivot, so that the brush X³ is raised off of the contact-rings W W' and the motor-circuit is broken. It will thus be seen that as the pulley D³ rotates through a distance corresponding to the forward travel of the carriage during the printing operation the trip H must return through a corresponding distance to release the lever F and stop the spring-motor, and as the shaft B, with its attached disk T, must rotate until the circuit to the electrical motor is broken it will be apparent that said shaft rotates through an angular distance exactly equal to that traversed by the spring-drum and the pulley in returning the carriage. Hence it is that the spring will be rewound by an amount corresponding to that which it was unwound in returning the carriage. In other words, the spring will be restored exactly to its normal tension.

It is to be particularly noted that the relation between the primary electric motor and the return spring-motor insures the greatest economic efficiency in the operation of my invention—that is to say, by employing a train of reducing-gearing between the electric motor and the spring-drum of the return-motor the energy of the power-storing mechanism— viz., the energy of the electric motor required to wind the spring of the return-motor—is reduced to a minimum measured at any given instant during its operation. Thus it is possible to store energy in the return-motor spring by means of a very small motor with a minimum torque, but making a large number of revolutions, and, furthermore, makes it possible to employ an electric motor of small power, running only intermittently, which quickly gains its normal speed after starting and as quickly comes to rest when its current is interrupted.

I regard it as broadly new in this art to so combine the gearing and motor mechanism that a very small motor revolving very rapidly—that is, paying out at any instant a minimum of power—suffices to maintain the energy of the return-spring and to so adjust the relation between the motor mechanisms that the primary motor—for instance, a small electric motor—attains its normal speed at once and continues its winding during the whole or a portion of the period required to return the carriage to the beginning of a new line. I also regard it as broadly new to so adjust the relation between the motor mechanisms that the primary motor begins its operation coincidently or substantially coincidently with the action of the return-spring motor and continues such operation until the normal tension of the return-spring has been restored, after which said primary motor is automatically cut out of action. I therefore desire that my broader claims should have a corresponding generic interpretation.

Obviously the return-motor may be called into requisition to impel the carriage back to the starting-point at any point in its forward progression and that also with the assurance that the spring of the return-motor will be rewound to the extent of its unwinding in driving the carriage and that no overwinding can occur.

My invention is exceedingly effective in operation, simple in construction and application, and as current is applied to the electric motor only while the normal tension of the return-spring is being restored and when the normal tension has been regained is automatically cut out the device is economical and efficient.

As the preferred form of my invention is embodied in a unitary structure not dependent upon the carriage or other part of the type-writer and is connected to the typewriter only by the pulley-band which returns the carriage, it is adapted to be applied to any machine in such manner as convenience or expediency may require.

What I claim is—

1. A type-writer having means for impelling the paper-carriage in one direction, a motor for impelling said carriage in the opposite direction, and an additional motor operatively connected with said first-mentioned motor said latter motor operating during the return movement of the carriage, and until the required power of said first-mentioned motor is restored, and means to start and stop said motors.

2. A type-writer having a paper-carriage, means for impelling said carriage in its advance movement, a spring-motor for impelling said carriage in the opposite direction, an additional motor operatively connected with said first-mentioned motor, said additional motor operating during the return movement of the carriage and until the required energy of said first-mentioned motor is restored, and means to start and stop said motors.

3. A type-writer having means for impelling the paper-carriage in one direction, a motor for impelling said carriage in the opposite direction, an additional motor operatively connected with said first-mentioned motor, said additional motor beginning its operation substantially coincidently with that of said first-mentioned motor and continuing such operation during the return movement of said carriage and until the required power of said first-mentioned motor is restored, and means to start and stop said motors.

4. A type-writer having a paper-carriage, means for impelling said carriage in its advance movement, a spring-motor for impelling said carriage in the opposite direction, said motor being disconnected from the carriage during the advance movement of the latter, an additional motor operatively connected with said first-mentioned motor, said additional motor operating during the return movement of the carriage and until the tension of the spring is restored, means to connect the spring-motor to the carriage to reverse the latter, and means to start and stop both motors.

5. A type-writer having a paper-carriage, means for impelling said carriage in its advance movement, a spring-motor for impelling said carriage in the opposite direction, and mechanism adapted to connect said carriage and said spring-motor during the reverse movement of the carriage, said mechanism comprising a pulley-wheel connected to the carriage, and a series of cams connected to the spring-motor and the pulley-wheel in such way that the carriage and spring-motor are automatically thrown into engagement at the beginning of the return movement and automatically released when the beginning of a new line is reached.

6. A type-writer having a paper-carriage, means for impelling said carriage in its advance movement, a spring-motor for impelling said carriage in the opposite direction, and mechanism adapted to connect said carriage and said spring-motor during the reverse movement of the carriage, said mechanism comprising a pulley-wheel connected to the carriage, cam-rims on said pulley and said spring-motor respectively, and a ring intermediate of said pulley and motor provided with cams coöperating with the respective cam-rings on the pulley and motor, so related that the carriage and spring-motor are automatically thrown into engagement at the beginning of the return movement, and automatically released when the beginning of a new line is reached.

7. A type-writer having a paper-carriage, means for impelling said carriage in its advance movement, a spring-motor for impelling said carriage in the opposite direction, a clutch adapted to connect said carriage and said spring-motor during the reverse movement of said carriage, an additional motor operatively connected with said first-mentioned motor, said additional motor operating during the return movement of the carriage and until the tension of the spring is restored, and means to start and stop said motors.

8. A type-writer having a paper-carriage, a spring-motor for impelling said carriage in its advance movement, a spring-motor for impelling the carriage in the opposite direction, and an additional motor operatively connected with said second-mentioned spring-motor, said additional motor operating during the return movement of the carriage and until the tension of the spring of the second-mentioned motor is restored, means for connecting said second spring-motor and the carriage during the reverse movement of the latter, and means to start and stop said second motor and said additional motor to reverse the carriage and restore the tension of said second spring-motor.

9. A type-writer having a paper-carriage, a spring-motor for impelling said carriage in its advance movement, a spring-motor for impelling the carriage in the opposite direction, a clutch adapted to connect said carriage and said second spring-motor during the reverse movement of said carriage, and an additional motor operatively connected with said second spring-motor, said additional motor operating during the return movement of the carriage and until the tension of the spring of the second-mentioned motor is restored, and means to start and stop said last-mentioned motors to reverse the carriage and restore the tension of said second spring-motor.

10. A type-writer having a paper-carriage, a spring-motor for impelling the carriage in its advance movement, a spring-motor for impelling the carriage in the opposite direction, a clutch adapted to connect said carriage and said second spring-motor during the reverse movement of said carriage, an electric motor operatively connected to said second spring-motor to restore the tension of the spring, and means to start and stop said last-mentioned motors, comprising a lever having a let-off and stop for said second spring-motor, and a circuit-closer for said electric motor.

11. A type-writer having a paper-carriage, means for impelling said carriage in its advance movement, a spring-motor for impelling the carriage in the opposite direction, a clutch for connecting said carriage and said spring-motor during the reverse movement of the carriage, said clutch comprising a cam-rim on the spring-motor, a cam-rim on the return-pulley, and an intermediate ring having cam edges adapted to coöperate with the respective cam-rims, an electric motor operatively connected to said spring-motor to restore the tension of the spring, and means to start and stop said motors comprising a key-actuated let-off and stop for said spring-motor, and an automatic circuit-closer for said electric motor.

12. A type-writer having a paper-carriage, means for impelling said carriage in its advance movement, a spring-motor for impelling the carriage in the opposite direction, a clutch adapted to connect said carriage and said spring-motor during the reverse movement of said carriage, an electric motor geared to said spring-motor, means for starting and stopping the spring-motor comprising a ratchet connected to said spring-motor, and a key-actuated pawl-lever coöperating with said ratchet, and switch mechanism for starting and stopping said electric motor, said mechanism comprising insulated circuit-terminals on the motor-casing, a revoluble brush on the spring-motor shaft coöperating with said circuit-terminals, and a pin on said spring-motor adapted to engage said brush and break the circuit to the motor.

13. An actuating mechanism for reversing type-writer paper-carriages and the like, comprising a prime motor, a spring-motor operatively connected therewith, a driving member actuated by said spring-motor, a clutch for connecting said spring-motor and said driving member, and means to start and stop said spring-motor and said prime motor, said prime motor operating during the return movement of the paper-carriage and until the normal tension of the spring-motor has been restored.

14. An actuating mechanism for reversing type-writer paper-carriages and the like, comprising an electric motor, said electric motor operating during the movement of said spring-motor, a spring-drum motor operatively connected therewith, a driving-pulley actuated by said spring-motor, a clutch for connecting said pulley and said spring-motor, and means for starting said motors and for stopping the spring-motor when the beginning of a line has been reached, and for stopping the electric motor when the energy of the return-spring has been restored.

15. An actuating mechanism for reversing type-writer paper-carriages and the like, comprising an electric motor, a spring-drum motor operatively connected therewith, a driving-pulley actuated by said spring-motor, a clutch for connecting said pulley and said spring-motor, a let-off and stop for said spring-motor, and an automatic circuit-closer for said electric motor comprising two circuit-terminal conductor-rings secured to the electric-motor casing, a brush fixed to the spring-motor shaft and adapted to engage said rings, and a pin on said spring-motor coöperating with said brush to break the circuit.

16. A type-writer having means for impelling the paper-carriage in one direction, a motor for impelling said carriage in the opposite direction, an auxiliary electric motor, and reducing-gearing connecting said electric motor and said first-mentioned motor whereby the energy of the first-mentioned motor is restored and the power of said electric motor expended in such restoration is reduced to a minimum measured at any given instant during its operation.

17. A type-writer having means for impelling the paper-carriage in one direction, a spring-motor for impelling said carriage in the opposite direction, an auxiliary electric motor, and reducing-gearing connecting said electric motor and said spring-motor, whereby the energy of the spring-motor is restored and the power of the electric motor required to wind the spring-motor is reduced to a minimum measured at any given instant during its operation.

18. A type-writer having means for impelling the paper-carriage in one direction, a spring-motor for impelling said carriage in the opposite direction, mechanism adapted to connect said carriage and said spring-motor during the reverse movement of the carriage, an auxiliary electric motor, and reducing-gearing connecting said electric motor and said spring-motor, whereby the power of said electric motor required to wind the spring-motor is reduced to a minimum measured at any given instant during its operation.

19. A type-writer having means for impelling the paper-carriage in one direction, a spring-motor for impelling the carriage in the opposite direction, and mechanism for connecting said carriage and said spring-motor during the reverse movement of the carriage, said mechanism comprising a loose pulley on said spring-motor shaft, a loose ring on said shaft adjacent to said pulley, said ring having means for engaging the pulley and the spring-motor when the latter is actuated, whereby the carriage and the spring-motor are automatically thrown into engagement at the beginning of the return movement and automatically released when the beginning of a new line is reached.

20. A type-writer having means for impelling the paper-carriage in one direction, a spring-motor for impelling said carriage in the opposite direction, a clutch adapted to connect said carriage and said spring-motor during the reverse movement of said carriage, an auxiliary electric motor geared to said spring-motor, means for starting and stopping said spring-motor and switch mechanism for starting and stopping said electric motor, said switch mechanism being operated by the relative advance of the spring-motor and its shaft, whereby the switch will be closed by the starting of said spring-motor, and opened when the shaft has revolved through an angular distance equal to that described by the spring-motor in returning the carriage, thus exactly restoring the return-spring to its normal tension.

21. An actuating mechanism for reversing type-writer paper-carriages and the like, comprising an electric motor, a spring-motor, reducing-gearing connecting said electric motor with said spring-motor, a driving-pulley actuated by said spring-motor, a clutch for connecting said pulley and said spring-motor during the operation of the latter, means for starting and stopping said spring-motor, and switch mechanism for starting and stopping said electric motor, said switch mechanism being actuated to close the motor-circuit by the relative advance of the spring-motor in starting with respect to the shaft of said spring-motor, and to open the motor-circuit by the corresponding advance of the said shaft.

In testimony whereof I affix my signature in presence of two witnesses.

NEAL LARKIN ANDERSON.

Witnesses:
W. A. SAFFOLD,
J. W. TERRY.